March 27, 1962  P. DIETIKER ETAL  3,027,498
DIAPHRAGM VALVE CONTROLLER
Filed Oct. 27, 1958

INVENTORS
PAUL DIETIKER
HUGH M. MORGAN
BY
ATTORNEY

United States Patent Office 3,027,498
Patented Mar. 27, 1962

3,027,498
DIAPHRAGM VALVE CONTROLLER
Paul Dietiker, Redondo Beach, and Hugh M. Morgan, Culver City, Calif., assignors to Minneapolis-Honeywell Regulator Company, Minneapolis, Minn., a corporation of Delaware
Filed Oct. 27, 1958, Ser. No. 769,850
3 Claims. (Cl. 317—165)

This invention relates to diaphragm valves and, more particularly, to a pilot valve or diaphragm controller for a diaphragm valve which is adapted to be used in a heating installation wherein the current for controlling the diaphragm valve is supplied by a thermopile heated by the pilot burner for igniting a main furnace burner.

The heating controls industry has been constantly trying to reduce the cost of diaphragm valves of this type as well as to make the valves smaller, more reliable in their operation, and generally more acceptable for use in heating systems.

One of the objects of this invention is to reduce the cost by reducing the number of parts required for a valve of this type without sacrificing the valves ability to perform the function that is desired.

Another object of the invention is to provide a valve design wherein a number of critical manufacturing tolerances are reduced to a minimum.

A still further object of the invention is to provide an arrangement wherein a single coil spring serves as its own adjusting means, means for biasing a valve to its open position and as means to hold the operating mechanism for the valve in its assembled relationship with the other elements of the valve.

Figure 1:
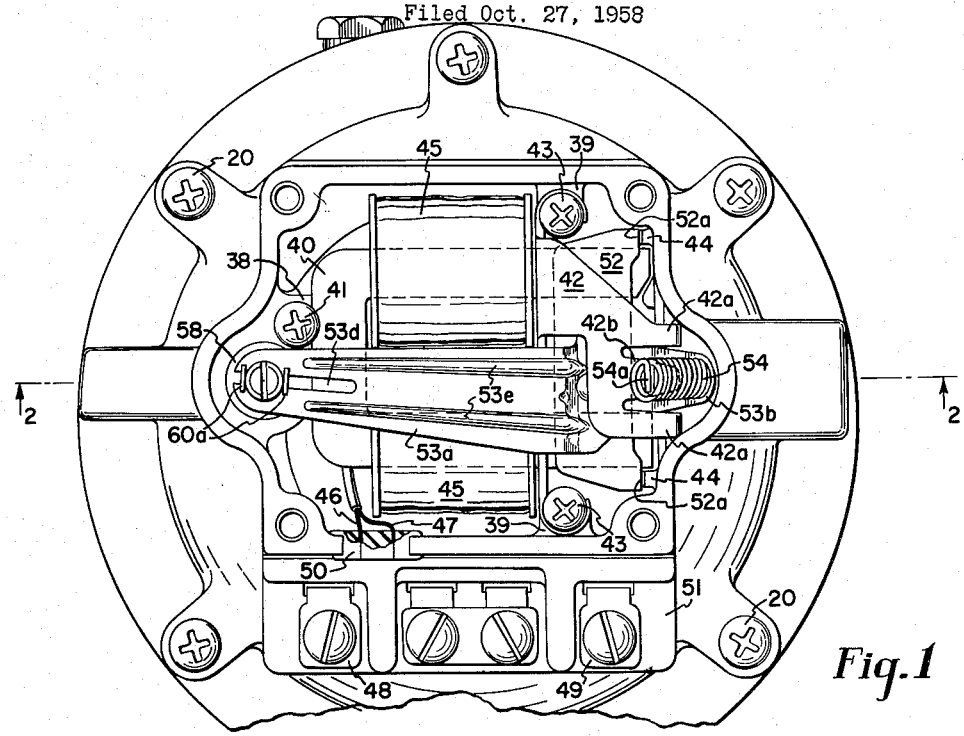
Figure 2:
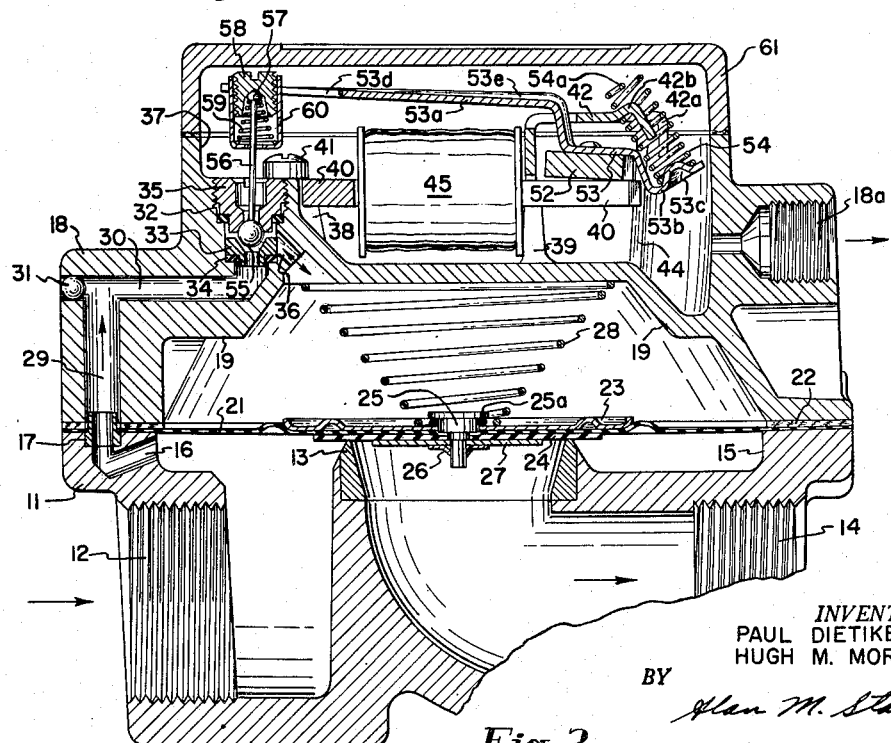

These and other objects of the invention will become apparent upon reading the following detailed description of the invention in conjunction with the accompanying drawing wherein:

FIGURE 1 is a plan view of the valve with its cover removed and with a portion of the valve body broken away; and FIGURE 2 is a sectional view taken along the line 2—2 of FIGURE 1 and with a portion of the valve body broken away.

As can be seen in FIGURE 2 of the drawing, the valve body consists of a lower casting 11 having a threaded inlet 12, a valve seat 13 lying in a plane parallel to the axis of the inlet 12, and an outlet 14 substantially coaxial with the inlet 12. The lower casting also has an open tap with a recess 15 surrounding the valve seat 13 and a passage 16 leading from the recess to a sleeve like fitting 17 extending upwardly from the upper surface of the casting 11.

An upper casting 18 has a stepped recess 19 extending upwardly into the upper casting and having a lower periphery substantially the same as the upper periphery of the recess 15 in the lower casting.

The casting 18 is bolted to the lower casting by means of bolts 20 extending through apertures in the upper casting and screw threaded into threaded sockets in the lower casting. A diaphragm 21, having a hole therein through which the sleeve fitting 17 extends, is clamped between the two castings along with a sealing gasket 22 positioned between it and the upper casting. The diaphragm has a backing plate 23 resting against its upper surface and a valve disc 24 resting against its lower surface, with the three held together by means of a headed pin 25 extending through aligned holes in the three members and with a tinnerman clip 26 holding a washer 27 tightly against the valve disc. The valve disc 24 and diaphragm 21 are compressed between the washer 27 and a shoulder on pin 25 to effect a seal. A spring 28, and the backing plate 23 are loosely retained under an annular shoulder 25a of pin 25. Better sealing between 13 and 24 results from preventing bowing of 24 due to compressing against 25 by leaving 23 only lightly retained.

The upper casting also has a bore 29 extending upwardly from the coupling 17 to a transverse bore 30. The outer end of the bore 30 is sealed by a ball plug 31 being pressed therein, with the other end thereof terminating in a stepped and threaded vertical bore 32.

An annular valve seat member 33, having a conical valve seat in its upper surface, is centered in the lower portion of the bore 32 and against a sealing washer 34. An upper annular valve seat member 35 is screw threaded into the upper portion of the bore 32 and also has a conical valve seat at its lower end opposing the valve seat in the lower seat member to form a ball valve chamber therebetween. A diagonal passage 36 extends from the bore 32 between the valve seat members to the chamber 19 above the diaphragm 21.

The upper casting 18 has a recess 37 in its upper or top surface and has three spaced bosses 38, 39, and 39 on which a generally U-shaped magnetic core 40 rests. The base of the core 40 is clamped to the boss 38 by means of a bolt 41 while the legs of the core are held near their ends against the bosses 39 by means of a bracket 42 secured to the bosses 39 by means of bolts 43. The ends of the core arms are positioned between and against two upwardly extending ribs 44 that decrease in thickness as they approach the upper edge of the casting 18, to serve as abutments for purposes to be presently described. Mounted on each leg or arm of the core 40 is a wire coil 45. The coils are wound with one unbroken length of wire the ends 46 and 47 of which form the leads which are connected to terminals 48 and 49, respectively. The wires pass through slits in a rubber grommet 50 extending through an aperture in a side wall of the upper casting. The terminals 48 and 49 are two of a plurality of terminals, mounted on a terminal block 51 and suitably secured between castings 18 and 61.

A generally rectangular armature 52, having two side projections 52a thereon, extends across the two arms of the U-shaped core with the lower edges of the projections 52a resting on the top surfaces of the core arms and bearing end-wise against the vertically extending and inclined ribs 44 formed on the side wall of the recess 37. A lever 53 has a laterally offset arm 53a extending lengthwise of the core and the coils 45 and beyond the base of core 40 and a transversely offset arm 53b extending beyond the legs of the core 40 and inclined from a point below the lower surface of the armature 52 upwardly and outwardly away from the armature 52. The arm 53b has an upwardly struck spring retaining detent 53c therein to receive one end of a coil spring 54.

The bracket 42 has two L-shaped arms 42a extending outwardly and downwardly over the armature 52 and on opposite sides of the coil spring 54 to help retain it in its position between lever arm 53b and the bracket 42. A third arm 42b also extends beyond the armature 52 and is bent slightly upwardly and then downwardly at an angle toward the detent 53c so as to extend between the loops of the compression spring 54. The width of the arm 42b is slightly less than the inside diameter of the coil spring 54 and the spring 54 is threaded onto the arm 42b so that the mere rotation of the coil spring adjustably positions the upper end of the coil spring with respect to the lever 53. This adjustment variably loads the lever in a direction (clockwise as seen in FIGURE 2) to rock it about the armature arms 52a as a pivot on the core 40 and the inside surfaces of the ribs 44. The upper end of the coil spring 54 terminates in a straight portion 54a that extends diametrically across the ends of the coils to serve as a handle for turning the spring to calibrate the loading of the spring on the armature lever.

A ball valve 55 has a stem 56 that extends upwardly through the valve seat 35. The stem carries a head 57 at its upper end that is firmly biased against the inner end of an externally threaded socket member 58. A connector, including the socket member, is screw threaded into a slot 53d in the lever 53 to variably position the ball valve with respect to the end of the lever. A conical coil spring 59 surrounds the valve stem 56 with the small end of the spring bearing against the head 57 on the valve stem and its lower end resting on a generally U-shaped metallic strap 60 that has head portions 60a that extend over the upper surfaces of the forked end of the lever 53. It will be noted that the arm 53a of the lever has longitudinally extending ribs formed therein to stiffen the arm. It will also be noted that the length of the stem 56 is such that the ball valve 55 will be seated against the upper valve seat 35 when the armature 52 is positioned at a slight angle to the surface of the core 40. When the coils 45 are energized, the raised edge of the armature will be pulled substantially to the top surface of the core 40 at which point the ball valve 55 will be seated on the lower valve seat member 33, the armature 52 having been rocked about its lower righthand edge on the top surface of the core 40 and the two ribs 44. It will be noted that the coil spring 54, being disposed at an angle to the surface of the core 40 and at an angle to a vertical line through the pivot edge of the armature 52, will serve to bias the lever clockwise about the pivot edge and to hold the pivot edge against both the upper surface of the core and the surface of the ribs 44.

Due to the fact that the spring 59 will keep the head 57 of the valve stem firmly against the connector 58 and the spring 54 will hold the edge of the armature against the core and ribs, there will be no play in these connections and, therefore, manufacturing tolerances will be less critical. This construction, along with the armature spring adjustment, helps considerably in reducing the cost of the valve below similar prior art valves.

*Operation*

The diaphragm valve is illustrated in its closed position with the inlet 12 in communication with the chamber over the diaphragm through the passages 16, 29, 30, valve seat 33, and passage 36. This enables gas or any other fluid being controlled by the valve to offset the pressure exerted by the fluid underneath the diaphragm and to enable the spring 28 to hold the valve disc 24 against the seat 13.

When the valve is installed in a heating system, a room thermostat (not shown) will cause energization of the coils 45 and cause the armature 52 to be drawn toward the core 40, against the bias of spring 54. This moves the ball valve 55 from its seating position on the member 35 to seating position on member 33. Gas can then escape from the diaphragm chamber through passage 36, valve seat 35, the chamber surrounding the coils 45 and exhaust to the atmosphere or to a bleed burner (not shown) through the threaded outlet 18a. With the pressure in the chamber above the diaphragm reduced to atmospheric pressure, the gas pressure under the diaphragm is then able to open the valve against the bias of spring 28.

When the room thermostat becomes satisfied, the coils 45 will become deenergized, enabling the spring 54 to rock the lever clockwise to return the ball valve to its starting position, thus allowing the main valve to close under the bias of spring 28 with gas pressure once again being present in the chamber above the diaphragm.

As it is deemed to be obvious that various modifications may be made in the invention without departing from the spirit thereof, it is to be understood that the scope of the invention is to be determined from the appended claims.

I claim as my invention:

1. A control comprising a housing having a pair of spaced vertical ribs, an electromagnet having a U-shaped core member secured in said housing generally perpendicular to said ribs with the ends thereof positioned between said ribs, a generally rectangular armature extending across the ends of said core and having an edge thereof resting against said core and ribs, a lever secured to said armature and having a first portion extending beyond one side thereof and a second portion extending from the other side thereof between and beyond said ribs, control means operably connected to said first portion of said lever, a bracket connected to said housing and having an arm extending between said ribs with a projection directed toward said second portion of said lever, and a coil spring surrounding said projection and adjustably threaded on said bracket arm and bearing against said second portion so as to hold said edge of said armature against said core and ribs and to pivot said armature and lever and control means about said edge.

2. The combination comprising a housing having a pair of spaced vertical ribs, an electromagnet having a U-shaped core member secured in said housing with the ends thereof positioned between said ribs, a generally rectangular armature extending across the ends of said core with an edge thereof resting against said core and said ribs, a lever secured to said armature and having a first portion extending beyond the base of said core and a second portion extending between and beyond said ribs, a bracket located within said housing and having an arm extending over said armature with a projection directed toward said second portion of said lever, and a coil spring surrounding said projection and adjustably threaded on said bracket arm and bearing against said second portion so as to hold said armature against said core and ribs and to pivot said armature and lever on said core about said edge.

3. A control comprising a housing, an electromagnet having a core member secured in said housing and having a surface thereof extending generally horizontally within said housing, a generally rectangular armature extending across the end of said core, a lever secured to said armature and having a first portion extending from one side thereof and a second portion extending from the other side thereof, a bracket connected to said housing and having an arm with a projection thereon directed toward said second portion of said lever, and a coil spring threaded on said arm and around said projection and bearing against said second portion so as to hold an edge of said armature against said core and to pivot said armature and lever on said core.

References Cited in the file of this patent

UNITED STATES PATENTS

| | | |
|---|---|---|
| 925,673 | Zook | June 22, 1909 |
| 2,327,684 | Warrick | Aug. 24, 1943 |
| 2,336,887 | Piron | Dec. 14, 1943 |